US006794636B1

(12) United States Patent
Cardillo et al.

(10) Patent No.: US 6,794,636 B1
(45) Date of Patent: Sep. 21, 2004

(54) OPTO-ELECTRONIC SYSTEM

(75) Inventors: Marco Cardillo, Lausanne (CH); Roland Duteil, Genève (CH)

(73) Assignee: TESA SA, Renens (CH)

( * ) Notice: Subject to any disclaimer, the term of this patent is extended or adjusted under 35 U.S.C. 154(b) by 0 days.

(21) Appl. No.: 09/713,435

(22) Filed: Nov. 15, 2000

(30) Foreign Application Priority Data

Dec. 15, 1999 (EP) .......................................... 99811164

(51) Int. Cl.$^7$ .............................................. G01D 5/34
(52) U.S. Cl. ........................... 250/231.13; 250/227.11
(58) Field of Search ..................... 250/231.18, 231.11, 250/231.13, 227.11, 227.21, 227.28, 216; 341/11, 13, 14

(56) References Cited

U.S. PATENT DOCUMENTS

| | | | | |
|---|---|---|---|---|
| 3,627,069 A | * | 12/1971 | Ray et al. .............. 177/210 FP |
| 4,385,234 A | * | 5/1983 | Johnson .................. 250/231.1 |
| 4,661,698 A | | 4/1987 | Cappio et al. ......... 250/231.14 |
| 4,746,792 A | | 5/1988 | Dil ............................. 356/499 |
| 5,006,703 A | * | 4/1991 | Shikunami et al. .... 250/231.13 |
| 5,036,192 A | * | 7/1991 | Ishizuka et al. ....... 250/231.16 |
| 5,120,252 A | | 6/1992 | Mayo et al. ................... 445/22 |
| 5,168,268 A | * | 12/1992 | Levy .......................... 345/165 |
| 5,266,797 A | * | 11/1993 | Zuefferey ............... 250/237 G |
| 5,302,944 A | * | 4/1994 | Curtis ........................ 340/653 |
| 5,479,010 A | * | 12/1995 | Shimomura et al. ... 250/231.13 |
| 5,569,912 A | * | 10/1996 | Turk et al. .............. 250/231.14 |
| 5,841,133 A | * | 11/1998 | Omi ....................... 250/231.13 |
| 6,088,019 A | * | 7/2000 | Rosenberg ................... 345/156 |
| 6,104,023 A | * | 8/2000 | Maeda ................... 250/231.13 |
| 6,240,652 B1 | * | 6/2001 | Böbel et al. .................. 33/707 |
| 6,278,107 B1 | * | 8/2001 | Gaumet ................. 250/231.13 |

FOREIGN PATENT DOCUMENTS

| | | | | |
|---|---|---|---|---|
| EP | 0 838665 A1 | | 4/1998 | |
| EP | 0838665 | * | 4/1998 | .......... G01D/5/347 |
| JP | 61000712 | | 1/1986 | |
| JP | 61-000712 | * | 1/1986 | ............ G01D/5/36 |
| JP | 62-46317 | | 3/1987 | |
| JP | 7-27543 | | 1/1995 | |
| JP | 7-286861 | | 10/1995 | |
| JP | 11-508365 | | 7/1999 | |

* cited by examiner

*Primary Examiner*—David V. Bruce
*Assistant Examiner*—Chih-Cheng Glen Kao

(57) ABSTRACT

The opto-electronic system for dimension-measuring device comprises a transparent rule (30) comprising at least one portion provided with a succession of opaque graduations (31), a photo-emitter (20), a photo-detector (21), an integrated optical bloc (1) capable of concentrating the light beam generated by the photo-emitter (20) on the rule portion, and of concentrating the light beam having crossed said rule (30) on said photo-detector (21). The optical bloc (1), the photo-emitter (20) and said at least one photo-detector (21) are mounted on the same printed circuit board (2). The rule (30) occupies a plane perpendicular to said printed circuit board (2). The optical bloc comprises optical surfaces disposed opposite each side of said rule (30).

19 Claims, 4 Drawing Sheets

OPTO-ELECTRONIC SYSTEM

This application claims priority of European application EP99811164.5, filed Dec. 15, 1999, and whose contents are hereby incorporated by way of reference.

FIELD OF THE INVENTION

The present invention concerns an opto-electronic system for a dimension-measuring device, in particular an opto-electronic system for a portable device for measuring linear and/or angular displacement. The present invention concerns in particular an opto-electronic system for a displacement-measuring device of comparator type.

RELATED ARTS

Optical systems for measuring dimensions and angles are described notably in DE19505176 (Baumer Electric AG). They comprise generally a light emitter emitting a light ray sent by means of appropriate optics in the direction of a photo-detector. A graduated rule or disc is placed in the optical path between the emitter and the photo-detector. The illumination of the sensor is interrupted when a graduation of the rule or of the disc is in the optical path. A counter counts the number of interruptions of the signal supplied by the sensor in order to deduce therefrom the displacement of the rule or of the disc and to display a representative value of this displacement. Such devices are used notably in apparatus for measuring and comparing dimensions of machine parts.

A device of this type is described in patent CH683798 (TESA SA), to which the reader can profitably refer. This document describes an opto-electronic system comprising several photo-emitters mounted on a printed circuit board on one side of a rule provided with a double graduated track and several photo-detectors mounted opposite on a second circuit on the other side of the rule.

This device has the inconvenience of necessitating two printed circuit boards, and thus of having relatively important space requirements, so that it is difficult to integrate it within a portable device. Furthermore, it is difficult to align accurately the optical components mounted on two different boards, notably when the two circuits are subjected to temperature variations and thus to dilatations that are different.

Patent application WO87/07944 (Renishaw) describes another electro-optical device for measuring dimensions, in which the light beam emitted by a photo-emitter is reflected in the direction of the photo-detector by reflecting surfaces on the rule. The described construction makes it possible to place the photo-emitter and the photo-detector on the same printed circuit board and to use a single lens. However, the portion of the beam that is reflected is weak, so that the contrast of the signal received on the photo-detector is weak. Furthermore, the manufacture and aligning of the single lens are subjected to rather strict constraints in order for the optical beam to be focused on the rule and reflected precisely in the direction of the photo-detector by means of a single lens.

The abstract of patent application JP-A-61-000712, published May 29, 1986, in volume 10, N° 147 (P460) of <<Patent Abstracts of JAPAN >>, describes an optical reading device comprising a large number of individual optical elements that are difficult and costly to align correctly. Furthermore, it makes use of optical fibers between the photo-emitter and the printed circuit board that only increases the complexity, volume and cost of the device.

It is an aim of the present invention to propose an opto-electronic system for a dimension-measuring device that is improved over the prior art systems, notably a system that does not have the inconveniences mentioned.

Another aim of the present Invention is to propose an opto-electronic system for a dimension-measuring device of low cost, of high precision and having reduced space requirements, adapted for example to use in a comparator or in any other portable or small dimension-measuring device.

Another aim is to propose an opto-electronic system enabling to determine the position of a rule or of a disc read in transmission and comprising a succession of transparent and opaque zones.

BRIEF SUMMARY OF THE INVENTION

According to the invention, these aims are achieved by means of an opto-electronic system having the characteristics of the independent claims, variants of preferred embodiments being moreover described in the dependent claims.

According to the invention, these aims are achieved notably by means of an opto-electronic system comprising a transparent rule with at least one portion provided with a succession of opaque graduations, at least one photo-emitter, at least one photo-detector, an optical system capable of concentrating the light beam or beams generated by said at least one photo-emitter on said at least one portion, and of concentrating the light beam or beams having crossed rule on said at least one photo-detector, said rule and said optical system being able to be moved in relation to one another, and in which said photo-emitter and said photo-detector are on the same side of said rule. In a preferred embodiment, said photo-emitter and said photo-detector are mounted in the same plane, for example on a same printed circuit board.

This characteristic makes it possible to use the advantageous properties of a rule read in transmission, enabling an improved contrast, in a system in which the emitting and the receiving of light are made in approximately the same direction but in opposite sense. The system thus permits a rule read in transmission to be used with a photo-emitter and a photo-detector mounted on a same printed circuit board. This characteristic thus makes it possible to avoid the problems of mutual alignment and of positioning of the photo-emitter and photo-receiver.

According to the invention, these aims are further achieved by means of an optoelectronic system comprising a transparent rule with at least one portion having a succession of opaque graduations, at least one photo-emitter, at least one photo-detector, an optical system capable of concentrating the light beam or beams generated by said at least one photo-emitter on said at least one portion, and of concentrating the light beam or beams having crossed said rule on said at least one photo-detector, in which said optical system is constituted of an integrated optical bloc.

These characteristics thus allow the position of a transparent rule comprising opaque graduations to be determined with great accuracy, since all the optical surfaces are made in a same optical bloc. This characteristic has the advantage of avoiding the problems of mutual alignment of the optical components during assembly and the inaccuracies due to the different dilatations of the optical components. Furthermore, use of an ordinary transparent rule and of a single optical element manufactured for example by injection of synthetic material in a mould makes it possible to reduce the manufacturing cost of the system and to obtain an excellent contrast of the signal received on the photo-detector.

According to a preferred embodiment of the invention, the optical bloc, the photo-emitter and the photo-detector are mounted on the same printed board circuit, the rule moving for example in a plane perpendicular to that board. This arrangement makes it possible to reduce the system's space requirements and to move the printed board closer to the rule without increasing the size of the optical bloc.

According to a preferred embodiment of the invention, the optical bloc comprises a first optical surface for collecting the light beam emitted by said photo-emitter, a second optical surface for reflecting this light beam and concentrating it on said portion, a third optical surface for concentrating and reflecting the light beam having crossed said rule, and a fourth optical surface for concentrating said beam on said photo-detector. Thanks to this advantageous arrangement, each optical surface of the optical bloc effects only simple optical operations of reflecting and/or collimation, which makes it possible to use relatively simple optical surfaces, for example only spherical or possibly elliptical surfaces. In a preferred embodiment, all the optical surfaces are spherical or cylindrical.

In a preferred embodiment of the invention, an additional diversion is provided in the optical path between the photo-emitter and the photo-detector, allowing the optical path to be lengthened without increasing the optical bloc's space requirements, or, inversely, allowing these space requirements to be reduced without shortening the optical path. It is thus possible to use optical surfaces that are extremely easy to manufacture, for example spherical or even plane surfaces, even with devices of small size in which the focal distances are necessarily reduced.

DESCRIPTION OF THE DRAWINGS

The invention will be better understood with reference to the description of an embodiment illustrated by the attached drawings containing the figures, in which.

DETAILED DESCRIPTION OF THE INVENTION

Figure 1:
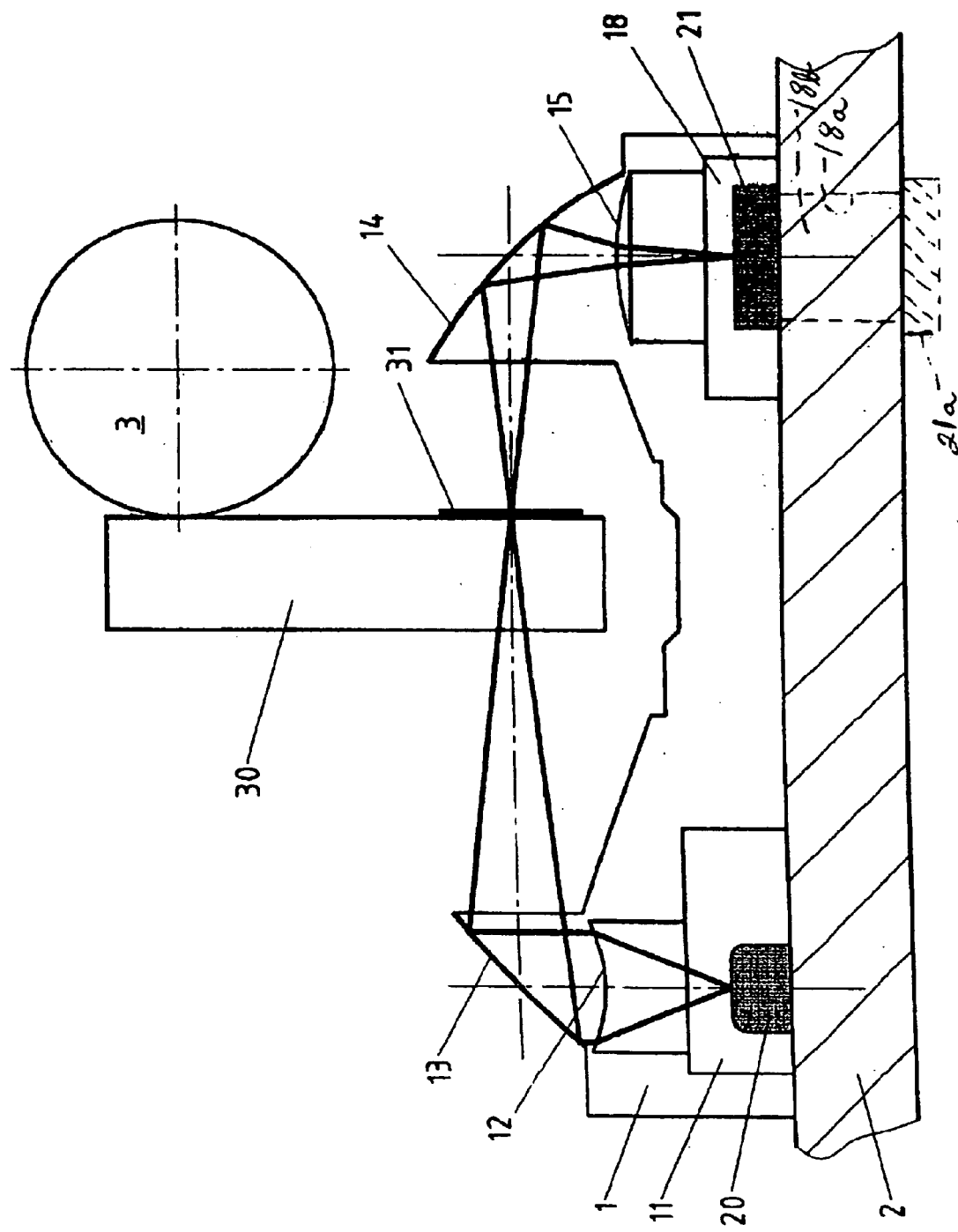
FIG. 1 shows a cross section of an opto-electronic system according to a first embodiment of the invention.
Figure 1A:
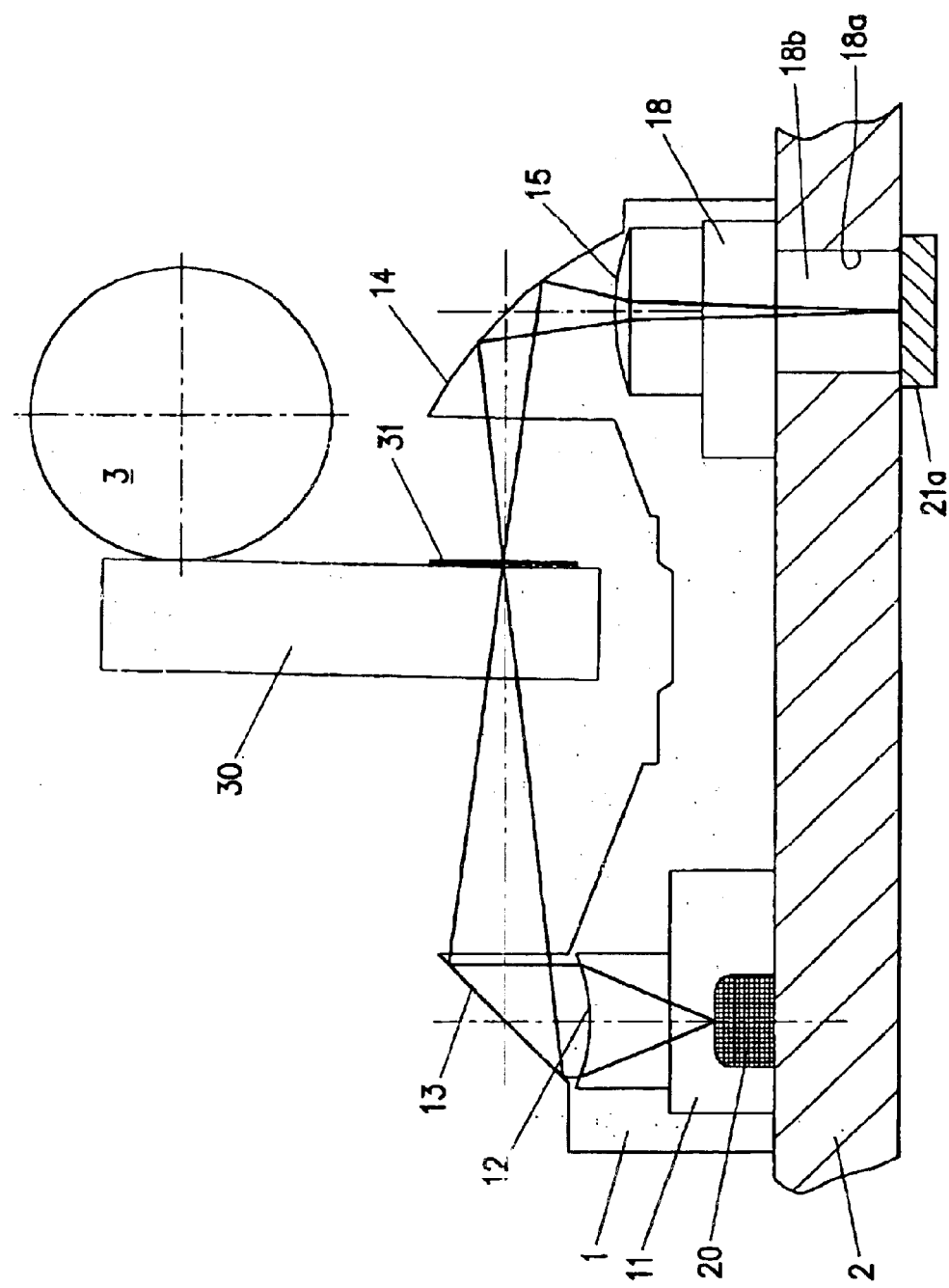
FIG. 1A shows a cross section of an opto-electronic system according to a further embodiment of the invention.
Figure 2:
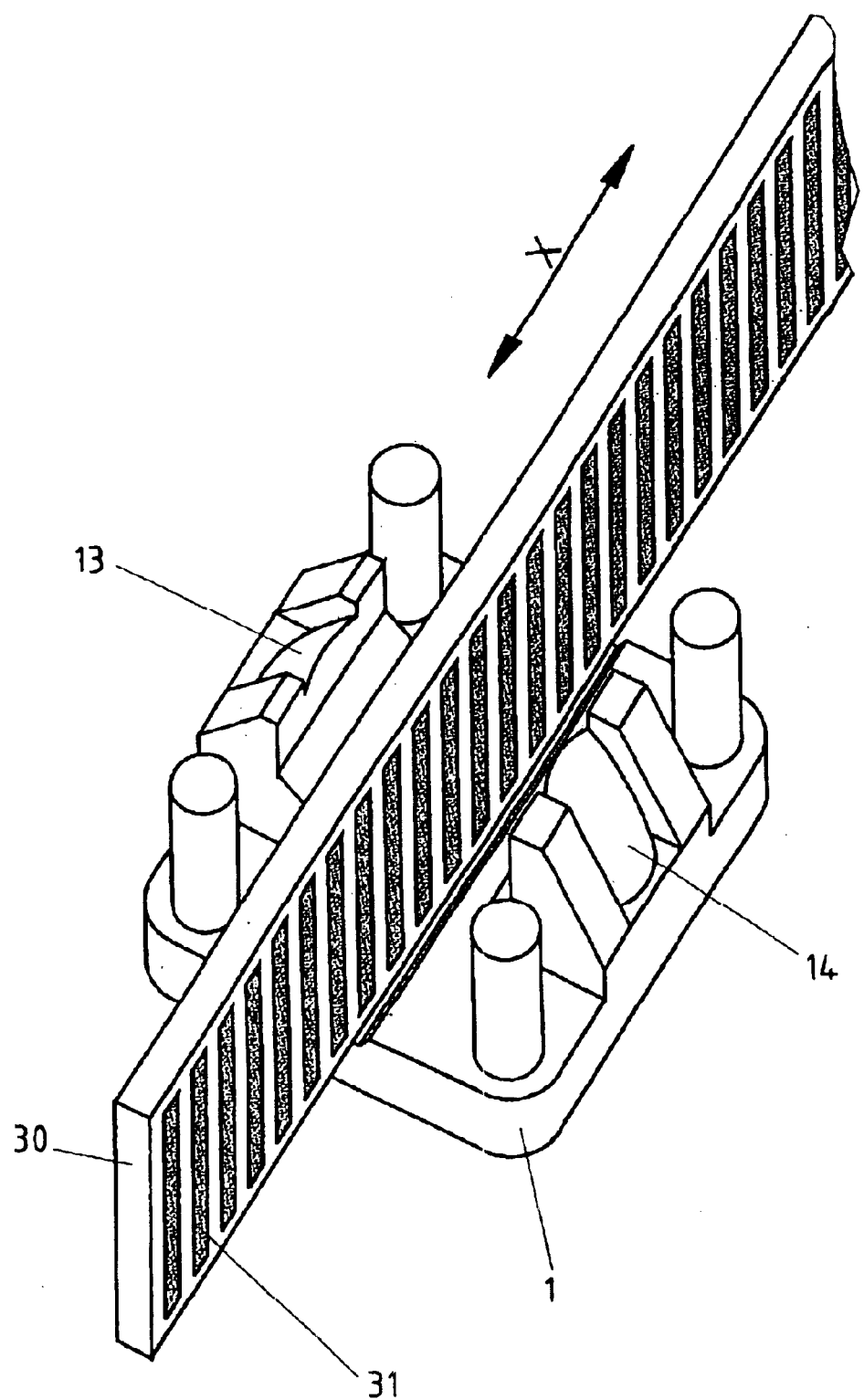
FIG. 2 shows a perspective view of an opto-electronic according to the first embodiment of the invention.

An opto-electronic system according to the invention, capable of being used for example in a dimension comparator, is illustrated in FIGS. 1 and 2. This system comprises a transparent rule 30 integrally attached to a shaft 3, for example to the comparator's probe, capable of being displaced by translation along the longitudinal direction x. The opto-electronic system permits an electric value representative of the position and/or of the speed of the shaft 3 to be supplied.

The rule 30 comprises at least one portion provided with graduations 31 constituted preferably by chromed zones, serigraphs or zones having been subjected to an appropriate surface treatment so as to render them opaque. The rule thus has alternating opaque and transparent zones. Various patterns of graduations on one or several portions of a transparent rule have been suggested, in order to permit a relative or preferably absolute encoding of the rule's position. The present invention is however not restricted to any specific arrangement of the graduated zones on the rule.

The opto-electronic system further comprises an integral optical bloc 1 mounted on a printed circuit board 2 on which the measuring and/or displaying electronics, not represented, are preferably also placed. The optical bloc 1 is fastened onto the board 2, for example by screwing and/or gluing.

Integrated optical bloc, in the context of this document, means a mould and/or worked optical element comprising several distinct optical sides, in contrast to optical systems composed of several individual elements, for example of lenses mounted in the lens frames. The one skilled in the art will understand that the integrated optical bloc can also be made up of two or more elements mould separately and integrally fastened to one another, for example mutually glued and/or screwed onto the same printed circuit board 2.

The rule 30 is capable of being displaced relative to the optical bloc 1. In a first embodiment of the invention, the rule is movable and the optical bloc is fixed. In a second embodiment of the invention, the rule is fixed whereas the optical bloc is mounted on an element capable of sliding along the rule. Other embodiments are possible in which the rule and the optical bloc are both movable. Furthermore, the invention can also be applied to apparatus whose rule can be displaced relative to the optical bloc along a trajectory that is not rectilinear, for example circular.

A photo-emitter 20, for example a light or infrared diode, is mounted on the board 2 and entirely lodged in a hollow 11 under the lower side of the optical bloc, so as to emit a light beam in the direction of a first optical surface 12 of the optical bloc. The first optical surface 12 is preferably spherical and thus enables the divergent rays emitted by the photo-emitter 20 to be collimated and oriented towards a second optical surface 13.

The second optical surface 13 is preferably elliptical or possibly spherical (or even plane), and inclined at about 45° relative to the optical axis of the incident beam. It thus allows this beam to be reflected and concentrated on the graduated portion of the rule 30. The surface 13 is preferably covered with a metallic layer in order to reflect the received beam.

The light beam having crossed the rule 30 reaches a third optical surface 14 of the optical bloc 1, which concentrates it once more by re-sending it in the direction of the board 2. In the same manner as for the second optical surface 13, the third optical surface 14 is preferably elliptical or possibly spherical (or even plane), and inclined at about 45° relative to the optical axis of the incident beam. It is preferably covered with a metallic layer in order to reflect the received beam.

In an alternative embodiment, at least one of the two optical surfaces parallel to the rule (not numbered) could be cylindrical instead of plane as illustrated in the figure, in order to correct astigmatism. It is also possible to provide optical surfaces of different shapes.

The optical beam reflected by the surface 14 is focalized by a fourth optical surface 15 in the direction of a photo-detector 21 mounted on the printed circuit board 2 and lodged in a hollow 18 under the lower side of the optical bloc 2. The surface 15 is preferably spherical.

The diameter of the focalization point of the light reflected by the optical surface 13 on the rule 30 covers preferably several successive graduations of the rule, the width of the graduations being possibly variable. In incremental measuring, the light beam must comprise a periodic structure of the same pitch as the rule 30. This periodic structure can for example be obtained by means of a reticule (grid), not represented, placed in the immediate proximity of the rule. In an alternative embodiment, a photo-receiver constituted by a succession of small photo-receivers disposed periodically is used so that the graduations 31 of the rule are projected onto the receptors with the same periodicity. In absolute measuring, the coded binary numbers appearing on the rule are read with multiple photo-receivers. The incremental measuring can also be used simultaneously with the absolute measuring.

In a preferred embodiment, a photo-detector 21a is mounted by the technique known under the expression "flip-chip" on the lower side of the printed circuit board, in which a hole 18a is provided. This hole 18a forms a well allowing the light that has to reach the photo-detector to pass through, but preventing the light coming directly from the photo-emitter to disturb the photo-detector. This hole is preferably filled by a protective transparent polymer 18b.

The or each photo-detector 21, for example an infrared photo-receptor or a charge-coupled device (CCD), generates an electric signal proportional to the intensity of the light beam having crossed the transparent portions of the rule 30. When the rule moves longitudinally along the axis x, each element of the photo-detector thus generates a succession of impulses that are approximately rectangular and that correspond to the graduations 31 passed through. These impulses can be counted by a binary counting device, not represented, that supplies at its output a binary number indicating the longitudinal position of the rule.

The one skilled in the art will understand that the optical bloc 2 of the invention can also be adapted to systems comprising two or several photo-detectors (or groups of photo-detectors) supplying different signals permitting to determine the direction of displacement of the rule 30 or its absolute position and, possibly, to interpolate the position inside a rule graduation interval. In this case, the different photodetectors (or groups of photo-detectors) 21 can for example be lodged in a common hollow 18, or each in an individual hollow of a same optical bloc 1. In an alternative embodiment, it is also possible to provide several photo-emitters 20 corresponding to the photo-detectors (or groups of photo-detectors) 21, situated in a common hollow 11 of a same optical bloc, or possibly each in an individual hollow of a same optical bloc, or even in a distinct optical bloc, the different optical blocs being preferably mounted and aligned on a same printed circuit board 2.

Furthermore, the two plane portions of the optical bloc opposite the rule (between the second optical surface 13 and the third optical surface 14) also constitute optical surfaces and could have surfaces that are not plane, for example cylindrical or spherical.

Figure 3:
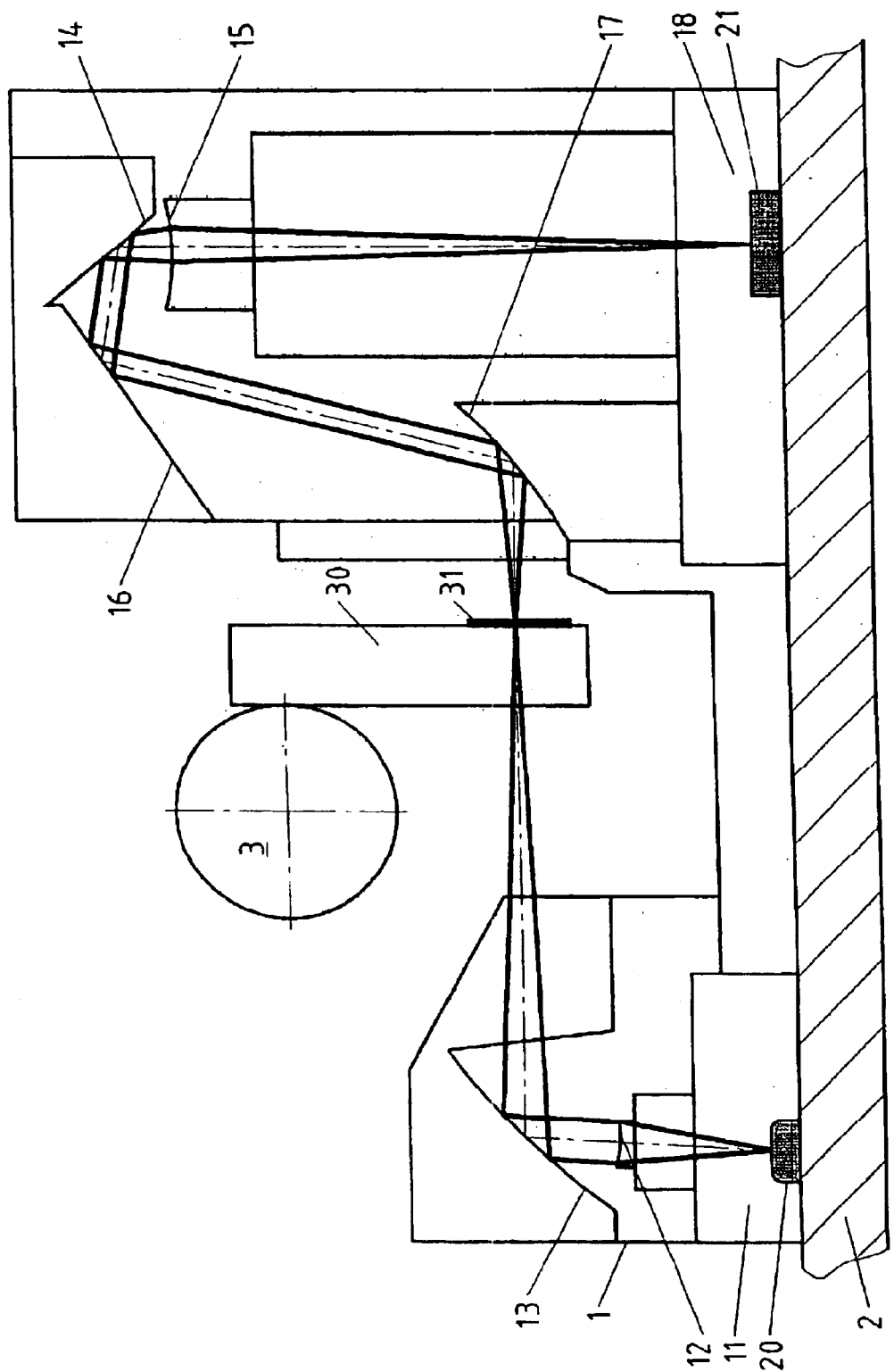
FIG. 3 shows a cross-section view of an opto-electronic system according to a second embodiment of the invention.

FIG. 3 illustrates schematically a cross section of a second embodiment of an optical bloc according to the invention. Identical or corresponding elements of the various embodiments are designated by the same reference symbol and are not described again, except whenever their mode of operation is different.

With respect to the embodiment illustrated in FIG. 1, the first optical surface 12 is inclined relative to the optical axis, so as to reflect the optical rays with a very small angle relative to the second optical surface 13 which is itself inclined. The angle of incidence on the second optical surface 13 is sufficiently small so as to ensure a total reflection on this surface, which thus does not need to be metal-coated. The first optical surface 12 is preferably spherical as well as, in this embodiment, the second surface 13.

The rays collimated by the surface 13 on the graduated portion of the rule 30 reach a fifth optical surface 17 that is also spherical and that also reflects them, thanks to a total reflection, to the sixth optical surface that is preferably plane. The light ray is then reflected onto the third optical surface 14, also plane and only slightly inclined relative to the optical axis, so as to reflect them, by total reflection, to the fourth optical surface 15, of spherical shape, which focalizes them onto the photo-detector 21.

With respect to the embodiment illustrated in FIGS. 1 and 2, this embodiment uses six plane or spherical optical surfaces that are very easy to make, rather than two spherical and two elliptical surfaces that are much more costly. Furthermore, the angles of incidence of the optical beam on the four reflecting surfaces 13, 14, 16, 17 are sufficiently small, so that it is possible to refrain from metal-coating these surfaces and to use total reflection.

Furthermore, it will be noticed that the two additional optical surfaces 16 and 17 in the embodiment of FIG. 3 have the light beam travel over a diversion that momentarily moves it away from the printed circuit board. It is thus possible to lengthen the optical path without increasing the distance between the photo-emitter 20 and the photo-receiver 21, and thus without increasing the space requirements of the optical bloc. It is also possible thanks to this characteristic to use optical surfaces at a great focal distance, thus permitting the use of surfaces that are spherical rather than elliptical. Finally, this characteristic also allows to reduce considerably the distance between the edge of the rule 30 and the printed circuit board 2 and thus to reduce even more the general space requirements.

In a preferred embodiment of the invention, at least one cylindrical optical surface will be used in order to compensate the astigmatism caused by the angle of incidence of the light ray on the spherical surfaces. A sixth surface of cylindrical shape can thus for example be used.

The one skilled in the art will further understand that depending on the constraints of size, manufacturing and accuracy of the system, certain surfaces can also, in the first and second embodiments, be cylindrical, parabolic or even simply plane rather than being spherical or elliptical.

The one skilled in the art will further conceive other constructions of optical blocs allowing the photo-emitter or photo-emitters and the photo-detector or photo-detectors to be disposed on a same plane that does not cross the rule. In particular, alternative embodiments of the optical bloc in which the light beam crosses several times the same point can easily be realized in the framework of this invention.

Although, in the two embodiments illustrated, the rule 30 moves in a plane that is perpendicular to the printed circuit 2, it will be noticed that it is also possible in the framework of this invention to use a rule placed at any angle, for example parallel, to the circuit 2. The rule is in any case placed in the optical path between the photo-emitter 20 and the photo-detector 21 assembled on the same side of this rule, preferably on the same printed circuit board.

Although the above description relates more particularly to the case of a displacement-measuring device (position, speed, acceleration etc.), it is clearly understood that the opto-electronic system can also be used in a system for measuring angular displacements. In this case, instead of the linear rule 3, a disc will be used that comprises one or several graduated tracks presenting alternating opaque and transparent segments and that is driven in rotation with the axis of which the angular position or speed is to be determined.

What is claimed is:

1. Opto-electronic system for measuring dimensions comprising:
   at least one photo-emitter,
   at least one photo-detector,
   a linear transparent rule comprising at least one graduated portion provided with a plurality of opaque graduations and capable of being displaced relative to an optical system,
   said optical system capable of concentrating a light beam or beams generated by said photo-emitter on said graduated portion and concentrating the light beam having crossed said rule on said photo-detector,
   said photo-emitter and said photo-detector being on the same side of said rule,
   wherein an imaginary straight line from said photo-emitter to said photo-detector does not intersect said rule,
   said optical system being constituted of an integrated transparent optical bloc having integral optical surfaces that are capable of reflecting and concentrating or focalizing the light beam, and
   wherein the rule is located between at least two of the optical surfaces of the optical bloc.

2. Opto-electronic system for measuring dimensions according to the preceding claim, wherein said photo-emitter and said photo-detector are mounted on a same printed circuit board.

3. Opto-electronic system for measuring dimensions according to the preceding claim, wherein said rule occupies a plane that is perpendicular to said printed circuit board.

4. Opto-electronic system for measuring dimensions according to the preceding claim, wherein said optical bloc comprises a first optical surface for collecting the light beam emitted by said photo-emitter and concentrating it on said portion of the rule, a second optical surface for reflecting this light beam and concentrating it on said portion of the rule, a third optical surface for concentrating and/or reflecting the light beam having crossed said rule, and a fourth optical surface for focalizing said beam onto said photo-detector, said second and third surfaces being are placed opposite each side of said rule.

5. Opto-electronic system for measuring dimensions according to claim 4, wherein said first and fourth surfaces are spherical.

6. Opto-electronic system for measuring dimensions according to claim 4, wherein at least one of said second and third surfaces is elliptical.

7. Opto-electronic system for measuring dimensions according to claim 4, comprising at least one cylindrical optical surface.

8. Opto-electronic system for measuring dimensions according to claim 4, wherein at least one of said second and third surfaces is metal-coated.

9. Opto-electronic system for measuring dimensions according to claim 4, wherein at least one of said second and third surfaces is inclined at about 45° relative to an optical axis of an incident beam.

10. Opto-electronic system for measuring dimensions according to claim 4, wherein said optical comprises a fifth optical surface and a sixth optical surface between said rule and said third surface, said fifth and sixth surfaces collimating said light beam.

11. Opto-electronic system for measuring dimensions comprising:
    at least one photo-emitter,
    at least one photo-detector,
    a linear transparent rule comprising at least one graduated portion provided with a plurality of opaque graduations and capable of being displaced relative to an optical system,
    said optical system capable of concentrating a light beam or beams generated by said photo-emitter on said graduated portion and concentrating the light beam having crossed said rule on said photo-detector,
    said photo-emitter and said photo-detector being on the same side of said rule,
    wherein an imaginary straight line from said photo-emitter to said photo-detector does not intersect said rule,
    said optical system being constituted of an integrated transparent optical bloc having integral optical surfaces that are capable of reflecting and concentrating or focalizing the light beam,
    said photo-emitter and said photo-detector being mounted on a same printed circuit board and are in the same plane, said rule occupying a plane that is perpendicular to said printed circuit board,
    said optical bloc comprising a first optical surface for collecting the light beam emitted by said photo-emitter and concentrating it on said portion of the rule, a second optical surface for reflecting this light beam and concentrating and/or reflecting the light beam having crossed said rule, a third optical surface, a fourth optical surface for focalizing the light beam onto said photo-detector, a fifth optical surface and a sixth optical surface between said rule and said third surface, said fifth and sixth surfaces collimating said light beam, and
    wherein the rule is located between at least two of the optical surfaces of the optical bloc.

12. Opto-electronic system for measuring dimensions according to claim 11, wherein and said third surfaces are placed opposite each side of said rule.

13. Opto-electronic system for measuring dimensions according to claim 11, comprising at least one cylindrical optical surface.

14. Opto-electronic system for measuring dimensions according to claim 11, wherein at least one of said second and third optical surfaces are spherical.

15. Opto-electronic system for measuring dimensions according to claim 14, wherein said second and third surfaces are sufficiently inclined relative to an optical axis so as to ensure a total reflection on said second and third surfaces.

16. Opto-electronic system for measuring dimensions according to claim 11, wherein said sixth optical surface is further removed from said printed circuit board than said graduated portion.

17. Opto-electronic system for measuring dimensions comprising:
    at least one photo-emitter,
    at least one photo-detector,
    a linear transparent rule comprising at least one graduated portion provided with a plurality of opaque graduations and capable of being displaced relative to an optical system,
    said optical system capable of concentrating a light beam or beams generated by said photo-emitter on said graduated portion, and concentrating the light beam having crossed said rule on said photo-detector,
    said photo-emitter and said photo-detector being on the same side of said rule, wherein an imaginary straight line from said photo-emitter to said photo-detector does not intersect said rule, said optical system being constituted of an integrated transparent optical bloc having integral optical surfaces that are capable of reflecting and concentrating or focalizing the light beam, said photo-detector being mounted on the side of a printed circuit board opposite said optical bloc, a hole in said printed circuit board allowing for the light beam to cross said board whilst protecting the photo-detector from the direct light of the photo-emitter, and wherein the rule is located between at least two of the optical surfaces of the optical bloc.

18. Opto-electronic system for measuring dimensions according to claim 17, wherein said hole is filled by a protective transparent material.

19. Opto-electronic system for measuring dimensions comprising:

at least one photo-emitter, at least one photo-detector, a linear transparent rule comprising at least one graduated portion provided with a plurality of opaque graduations and capable of being displaced relative to an optical system, said optical system capable of focusing a light beam or beams generated by said photo-emitter on said graduated portion and concentrating the light beam having crossed said rule on said photo-detector, said photo-emitter and said photo-detector being on the same side of said rule, wherein an imaginary straight line from said photo-emitter to said photo-detector does not intersect said rule, said optical system being constituted of an integrated transparent optical bloc having integral optical surfaces that are capable of reflecting, concentrating or focalizing the light beam, and wherein the rule is located between at least two of the optical surfaces of the optical bloc.

* * * * *